(12) United States Patent
Schwartz et al.

(10) Patent No.: US 10,800,935 B2
(45) Date of Patent: Oct. 13, 2020

(54) NON-SPARKING METALLIC INKS AND ARTICLES PRINTED WITH ME

(71) Applicant: SUN CHEMICAL CORPORATION, Parsippany, NJ (US)

(72) Inventors: Russell Schwartz, Cincinnati, OH (US); Tom DeBartolo, Monroe, NC (US); Steven Johnson, Fairfield, OH (US)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

(21) Appl. No.: 16/303,303

(22) PCT Filed: May 23, 2017

(86) PCT No.: PCT/US2017/033917
§ 371 (c)(1),
(2) Date: Nov. 20, 2018

(87) PCT Pub. No.: WO2017/205321
PCT Pub. Date: Nov. 30, 2017

(65) Prior Publication Data
US 2019/0211218 A1     Jul. 11, 2019

Related U.S. Application Data

(60) Provisional application No. 62/340,050, filed on May 23, 2016.

(51) Int. Cl.
| | |
|---|---|
| *C09D 11/037* | (2014.01) |
| *C08K 3/08* | (2006.01) |
| *C08K 5/00* | (2006.01) |
| *C09D 11/033* | (2014.01) |
| *C09D 11/102* | (2014.01) |
| *C09D 11/106* | (2014.01) |
| *C08K 3/28* | (2006.01) |

(52) U.S. Cl.
CPC .............. *C09D 11/037* (2013.01); *C08K 3/08* (2013.01); *C08K 3/28* (2013.01); *C08K 5/00* (2013.01); *C09D 11/033* (2013.01); *C09D 11/102* (2013.01); *C09D 11/106* (2013.01)

(58) Field of Classification Search
CPC .......................................... C09D 11/30–11/50
See application file for complete search history.

(56) References Cited

U.S. PATENT DOCUMENTS

| | | | | |
|---|---|---|---|---|
| 6,616,741 | B1* | 9/2003 | Sawa ...................... | C09D 11/17 106/31.28 |
| 7,828,888 | B2* | 11/2010 | Itano .................... | C09D 11/322 106/31.65 |
| 2008/0213518 | A1 | 9/2008 | Oyanagi et al. | |
| 2008/0216706 | A1 | 9/2008 | Ikeay et al. | |
| 2011/0139034 | A1 | 6/2011 | Wczasek et al. | |
| 2017/0348991 | A1* | 12/2017 | De Mondt ........... | B41M 5/0023 |

FOREIGN PATENT DOCUMENTS

| | | | |
|---|---|---|---|
| JP | 09/226825 A | * | 9/1997 |
| WO | WO 2016/071173 A1 | | 5/2016 |

OTHER PUBLICATIONS

English translation of JP 09/226825, Sep. 1997; 11 pages.*
International Preliminary Report issued in PCT/US2017/033917, dated Nov. 27, 2018.
Written Opinion of the International Searching Authority issued in PCT/US2017/033917 dated Aug. 14, 2017.
PCT International Search Report issued in PCT/US2017/033917 dated Aug. 14, 2017.
Supplementary European Search Report issued in counterpart EP Application No. 17803390.8, dated Mar. 27, 2020.
Supplementary European Search Report issued in counterpart EP Application No. 17803390.8, dated Jan. 3, 2020.

* cited by examiner

*Primary Examiner* — Helene Klemanski
(74) *Attorney, Agent, or Firm* — Charles C. Achkar; Ostrolenk Faber LLP.

(57) ABSTRACT

Described herein are metallic pigment-containing inks having a magnitude of exotherm <1200 J/g, or no observable exotherm at all. Also described are metallic pigment-containing inks that include 9.0 wt % or less nitrocellulose resin, or which are essentially free of nitrocellulose resin. Further described are articles printed with the described metallic pigment-containing inks, kits including such inks (and other inks), and methods of printing with such inks. The metallic pigment-containing ink described herein reduce, if not eliminate, the tendency of inks containing metallic pigments to spark and combust.

27 Claims, No Drawings

NON-SPARKING METALLIC INKS AND ARTICLES PRINTED WITH ME

The present application is a § 371 National Stage application of PCT/US2017/033917 filed May 23, 2017, which claims priority to U.S. Provisional Patent Application No. 62/340,050 filed May 23, 2016, each of which is incorporated herein by reference in its entirety.

FIELD OF THE INVENTION

The present application is directed to the field of printing inks, printed articles, and methods of printing articles, particularly involving metallic pigment-containing printing inks. Such printing inks are suited for application by, for example, flexographic and gravure printing methods.

BACKGROUND OF THE INVENTION

Metallic pigment-containing inks, such as those containing aluminum pigments, provide a very attractive appearance to printed articles. Metallic pigment-containing inks provide printed articles with a striking metallic appearance that exhibits shine, gloss, and reflectance. Metallic pigment-containing inks have been known to include nitrocellulose resin as a binder resin and a solvent. Relatively large amounts of nitrocellulose resin are included in such inks.

Metallic pigment-containing inks are susceptible to sparking during printing, which can lead to combustion and fire. For example, in high speed printing operations, such inks may spark and combust on the printing press, causing fire that damages the press, printed materials, and/or the surrounding area. The sparking of the ink may occur as it is being applied to the substrate. Thus, metallic pigment-containing inks have been known to present a workplace hazard, despite the beneficial properties they possess.

As the ink moves through the press, it flows past a doctor blade which removes excess ink. At fast press speeds, the action of the doctor blade creates friction on the surface of the inked substrate, which can lead to sparking of the ink. Thus, the action of, for example, a stainless steel doctor blade, in motion to remove excess ink and contacting the metallic pigment-containing ink (e.g., aluminum pigment-containing ink), creates friction that can lead to sparking and combustion.

Many printing operations occur at high speeds, thus the problem encountered when metallic pigment-containing inks are used is a real concern. Such substrate materials include, for example, polypropylene (PP), polyethylene terephthalate (PET) and polyamide materials. The printing press, such as a flexographic or rotogravure press, can run at speeds up to about 2600 feet per minute (fpm).

One possible approach to alleviating the sparking and combustion problem would be to dilute the ink formulation with water. However, adding water into a metallic pigment-containing ink does not effectively reduce the potential for sparking and combustion. To the contrary, adding water may exacerbate the problem. Hydrogen may be generated when, for example, an ink containing aluminum comes in contact with water. Hydrogen is potentially explosive and itself is a combustible material.

Thus, there is a need for a metallic ink composition for printing packaging such as flexible packaging that overcomes the disadvantages such inks, and in particular, the safety hazards that they present.

SUMMARY OF THE INVENTION

In one inventive aspect, described herein are metallic pigment-containing inks comprising a metallic pigment, wherein the inks exhibit a magnitude of exotherm less than 1200 J/g, or which do not exhibit an observable exotherm. In yet a more particular inventive aspect, the metallic pigment-containing inks comprise, based on the total weight of the ink, 9.0 wt % or less of nitrocellulose resin, or are essentially free of nitrocellulose resin.

In another inventive aspect, described herein are metallic pigment-containing inks comprising a metallic pigment, wherein, based on the total weight of the ink, the ink comprises 9.0 wt % or less of nitrocellulose resin, or the inks are essentially free of nitrocellulose resin. In yet a more particular inventive aspect, the metallic pigment-containing inks exhibit a magnitude of exotherm less than 1200 J/g, or does not exhibit an observable exotherm.

In yet another inventive aspect, described herein are metallic pigment-containing inks comprising a metallic pigment, one or more solvents, and one or more resins, wherein the inks are essentially free of nitrocellulose resin; or the inks include only a relatively small amount of nitrocellulose resin, e.g., 9.0 wt % nitrocellulose resin or less. Such inks may be free of antistatic additives, or contain only small amounts of same, which is advantageous because such additives may adversely affect dry ink film properties.

In yet still another inventive aspect, described herein are combinations of inks comprising one or more metallic pigment-containing inks as described herein and one or more colored inks that do not include a metallic pigment. But for the considerations regarding nitrocellulose resin content (or absence thereof) in metallic pigment-containing inks, the resin systems may be the same or different for metallic pigment-containing inks and inks that do not include metallic pigments. Such ink combinations may be provided in a kit of inks.

In even yet still another inventive aspect, described herein are printed articles comprising a substrate on which the metallic pigment-containing inks described herein is printed. Also described are printed articles in which inks from the kits described herein are printed onto substrates.

In even yet still another further inventive aspect, described herein are methods for printing articles in which the metallic pigment-containing inks described herein are printed onto substrates. Also described are methods in which inks from the kits described herein are printed onto substrates.

When working with ink combinations, e.g., kits of inks, such inks may be deposited onto a substrate material in a chosen order, e.g., in a chosen series of inks. The metallic pigment-containing ink may be as described above, e.g., may include no nitrocellulose resin or a small amount thereof. Combinations of inks, metallic inks and non-metallic inks may be provided in kits. Such ink combinations may provide benefit and efficacy over the mixed solvent (i.e. solvent and water) approach to formulating inks which do not necessarily alleviate the hazard, such as for example the unsafe condition of having an ink composition including aluminum pigment and water.

The non-metallic pigment-containing ink may be any commercially available ink, such as the ones identified for exemplary purposes later in this disclosure.

The applicants have surprisingly found that the presence of nitrocellulose resin in an ink that includes a metallic pigment may increase the susceptibility of the ink to sparking, which could result in combustion. The susceptibility to sparking may be dependent upon the amount of nitrocellulose resin in the metallic pigment containing ink composition. This finding is surprising because the person of ordinary skill in the art might not suspect that sparking was attributable to the amount of nitrocellulose resin in the ink. One way that the skilled person might try to solve the problem is by adding an anti-static agent to the ink, or by increasing the amount of anti-static agent in the composition.

From the finding that reducing or eliminating nitrocellulose resin in metallic pigment-containing inks eliminates the sparking and combustion problem, the applicants further realized that benefits could be attained from changing the entire set of inks used in a printing process. Inks are typically printed in combinations that are applied to a substrate. Further, different resin compositions often require different solvent blends to maintain ink viscosity throughout a press run. Thus, different inks with different resins and solvents may be printed on a substrate. The applicants have found that combinations of inks, e.g., one or more metallic pigment containing inks and one or more inks not including metallic pigments (ordinarily including another colorant) can be printed onto the same substrate in the same printing job, even though the inks of the combination may not employ the same resin systems. This finding is surprising. Generally, one skilled in the art may not use a combination of inks in which the inks include different resin systems. Combining inks of different resin systems in printing an article has been known to provide an inferior and/or unacceptable printed article characterized by poor compatibility of the ink combination, poor adhesion of one or more of the inks, poor runnability, and trapping problems. Runnability relates to the ability of an ink to print well and provide a defect free print, such as defect-free texts, logos, etc. Trapping refers to the printability of one ink over another, such as in process printing in which four (4) colors which are "trapped" providing a palette of many colors that result from the trapping.

Yet, in printing with the ink combinations described herein, which include the presently described metallic pigment-containing inks containing nitrocellulose resins in small amounts (or which are essentially free thereof), the sparking and combustion problem is solved and metallic pigment-containing inks can be provided—alone or in kits of inks—that do not present a safety hazard. The non-metallic inks of the combination may be formulated to be free of nitrocellulose resin or contain very little thereof, which further aids in eliminating the likelihood of sparking and combustion when printed on a printing press.

The Applicants have found that inventive inks of the present disclosure have been used for a period of time on a flexographic or gravure machine for several months and there have been no incidents of sparking and combustion during printing operations.

DETAILED DESCRIPTION OF THE INVENTION

Metallic pigment-containing inks are described herein. Articles printed with metallic pigment-containing inks have an aesthetically pleasing metallic appearance. Such inks may impart one or more of shininess, glossiness, reflectiveness, and/or an overall metallic appearance to a printed article such as a label, package, design, etc. Metallic pigment-containing inks are printable on conventional substrates, such as polypropylene (OPP), polyvinylchloride (PVC), oriented polystyrene (OPS), polyethylene terephthalate (PET), glycol-modified polyethylene terephthalate (PET-G) and polylactic acid (PLA) film, and other materials.

As noted, metallic pigment-containing inks heretofore known in the art may spark during printing, such as during printing on a flexographic or gravure printing press. This could lead to combustion, fire and/or explosion. The sparking may be caused by heating, static electricity, or some other effect. As indicated, the applicants surprisingly found that the problem appears to be associated with the amount of nitrocellulose resin present in the metallic pigment-containing ink formulations.

The present metallic pigment-containing inks are comprised of a metallic pigment, a resin system comprising one or more resins, and a solvent system comprising one or more solvents. Additional non-metallic pigment colorants may also be included. Other additives that are commonly found in inks compositions may also be included in the present metallic pigment-containing inks, and anti-static agents. Advantageously, the metallic pigment-containing inks described herein are essentially nitrocellulose resin free, or include only a small amount of nitrocellulose resin.

The metallic pigment-containing inks described herein contain no more than 9.0 wt % nitrocellulose resin, that is, they contain 0.01 wt % to 9.0 wt % nitrocellulose resin; more preferably 0.01 wt % to 7.5 wt % nitrocellulose resin; 0.01 wt % to 5.0 wt % nitrocellulose resin; still more preferably 0.01 wt % to 2.5 wt % nitrocellulose resin; and even still more preferably 0.01 wt % to 1.0 wt % nitrocellulose resin. These amounts are based on the (1) the nitrocellulose resin solids content, e.g., a commercially available nitrocellulose resin products may contain an amount of nitrocellulose resin solids and a liquid medium, such as an water or an organic liquid, and the amounts of nitrocellulose resins are indicative of the amount of nitrocellulose resin solids in the products; and (2) the ink compositions as formulated, inclusive of solvent(s) included in formulating the inks. For example, the metallic pigment-containing ink composition may include one or more solvents. The amounts of nitrocellulose resin indicated herein are based on the formulations of the inks that are inclusive of the solvent(s), that is the amounts reflect the nitrocellulose resin content prior to solvent removal that may occur, such as by one or more of evaporation, drying, heating, or other means. Such solvent removal may occur during printing after the ink is applied to a substrate, such as by drying at the ambient temperature or by drying with heat. These concepts are embodied in the examples that follow.

By "essentially nitrocellulose resin-free" or "essentially free of nitrocellulose resin" it is meant that there is 0-0.01 wt % nitrocellulose resin solids content in the ink, subject to the concepts expressed above. These terms are used interchangeably herein. "Nitrocellulose resins solids content" is explained below. These terms are inclusive of no nitrocellulose resin being present in the inks and coatings. Preferably, there is 0 wt % nitrocellulose in the metallic pigment-containing inks.

The applicants have found that when the amount of nitrocellulose resin content in the metallic pigment-containing inks is 9.0 wt % or less, or when the ink is essentially free of nitrocellulose resin, then the likelihood of the ink composition sparking, igniting, combusting, and/or exploding is significantly reduced, if not completely eliminated. Applicants have found that metallic pigment-containing ink compositions that meet the nitrocellulose resin criteria of 9.0 wt % or less can be safely used on a high speed printing press, such as a flexographic or gravure printing presses. In fact, such inks have been used for months on printing operations on such presses without the occurrence of safety endangering incidents.

In one aspect, the ratio of metallic pigment to nitrocellulose resin, when nitrocellulose resin is present, is in the range of 1:0.50 to 1:32.50, on a weight to weight basis. In another aspect, the ratio of metallic pigment to nitrocellulose resin is 1:0.60 to 1:27.50. In another aspect, the ratio of metallic pigment to nitrocellulose resin is 1:0.75 to 1:22.50. In another aspect, the ratio of metallic pigment to nitrocellulose resin is 1:0.90 to 1:18.50.

Any kind of metallic pigment may be used in ink compositions described herein. Preferably, the metallic pigment is an aluminum pigment, more preferably, a non-leafing aluminum pigment. Other kinds of metallic pigments may be used. The metallic pigment may be, for example, copper, silver, gold, copper-zinc alloys (e.g., brass), copper-tin alloys (e.g., bronze), stainless steel, carbon steel, iron, silver, zinc, nickel, titanium, chromium, manganese, vanadium, magnesium, zinc-magnesium alloys, and mixtures thereof. Combinations of metallic pigments may be used. For example, the metallic pigments may be a combination of aluminum and bronze.

A leafing pigment is a pigment that is localized at the top of the surface of the ink, whereas a non-leafing pigment is a pigment that is evenly distributed through the ink. Leafing pigments maybe coated with stearic acid or other saturated fatty acids, while non-leafing pigments are coated with oleic and other unsaturated fatty acids.

In some embodiments, the metallic pigment comprises a lubricant that is a residual from pigment manufacture. Suitable lubricants include, but are not limited to, saturated and unsaturated fatty acids.

In some embodiments, the metallic pigment is coated with one or more metal oxides. Metal oxides used to coat the metallic pigment include, but are not limited to, silicon dioxide, titanium dioxide, zinc oxide, zirconium dioxide, tin oxide, cerium dioxide, vanadium oxide, manganese oxide, lead oxide, chromium oxide, iron oxide, aluminum oxide, tungsten oxide, and hydroxides and mixtures thereof. In some embodiments, the coating comprises a hydrated oxide of any one of the aforementioned oxides. In some embodiments, the coating is also doped with an oxide of another metal, such as one or more of the aforementioned metals. The thicknesses of the metal oxide layers vary. In some embodiments, the thickness of the metal oxide layers is in the range of about 20 nm to about 400 nm. In some embodiments the metal oxide layers are partially transparent.

In some embodiments, the metallic pigment may be platelet- and/or flake-shaped. In some embodiments, the metallic pigment has a d50 (median particle diameter) in the range of about 1 μm to about 500 μm, such as about 5 μm to about 500 μm, about 1 μm to about 400 μm, about 1 μm to about 300 μm, about 1 μm to about 250 μm, about 1 μm to about 100 μm, or about 5 μm to about 100 μm. Median particle diameter d50 is measured by dynamic light scattering. In some embodiments, the average thickness (h50) of the metallic pigment is in the range of about 1 nm to about 5 μm, such as about 10 nm to about 5 μm, about 50 nm to about 5 μm, about 1 nm to about 2 μm, about 1 nm to about 1 μm, about 1 nm to about 500 nm or about 10 nm to about 500 nm. The h50 is measured by scanning electron microscopy. The metallic pigment may also be of any type of class of metallic pigment. In some embodiments the shape of the metallic pigment is described for example as cornflake, silver dollar, or vacuum metalized flake (VMP). In some embodiments, pigment is described as leafing or non-leafing.

The resins of the resin system employed in the metallic ink formulation may be one or more resins used in ink formulations. Preferred resins to be used in the resin systems used in formulating the metallic pigment-containing ink compositions include, by way of example, acrylate resins, methacrylate resins, polyurethane resins, polyvinyl butyral (PVB) resins, polyester resins, cellulose acetate propionate resins, polyamide resins, vinyl resins (e.g., polystyrene resins), rosins, shellacs, cellulose acetate butyrate (CAB), ethyl cellulose, and polyketones. Nitrocellulose resin may be included in the metallic pigment-containing inks in the limited amounts described above. Combinations of resins may be employed. In a preferred embodiment, the metallic pigment-containing ink composition includes one or more polyurethane resins. In a more preferred embodiment, the polyurethane resin or resins are the primary resin or sole resins of the ink compositions.

In one inventive aspect, the metallic pigment-containing inks exhibit a magnitude of exotherm of less than 1200 J/g, or exhibit no observable exotherm. While not wishing to be bound by any theory, applicants believe that this may be related to, as described above, using only a small amount of nitrocellulose resin in the compositions of the metallic pigment-containing inks, or by keeping such inks essentially nitrocellulose resin free. In the examples of inventive metallic pigment-containing inks that follow, it is shown that such inks do not spark, and are thus much safer to use, while retaining the printability, excellent visual appearance, and dry film benefits such as resistance to scratches, rub removal, etc., of compositions that include nitrocellulose resin.

The solvent system used in the metallic ink compositions may be any solvent commonly used in formulating an ink composition, or combinations thereof. Such solvents include, for example, aliphatic hydrocarbons, cyclic hydrocarbons, aromatic hydrocarbons, ketones, aldehydes, alcohols, ethers, and esters. Again, combinations of solvents may also be used. The solvent system for the ink compositions that do not include a metallic pigment used in combination with a metallic pigment-containing inks may also be may be any solvent commonly used in formulating an ink composition, or combinations thereof. Such solvents include, for example, aliphatic hydrocarbons, cyclic hydrocarbons, aromatic hydrocarbons, ketones, aldehydes, alcohols, ethers, and esters. Again, combinations of solvents may also be used.

Additives commonly included in inks may be included in the metallic pigment-containing inks and non-metallic pigment-containing inks described herein. Such additives are exemplified by adhesion promoters, light stabilizers, degassing agents, flow promoters, defoamers, antioxidants, UV stabilizers, surfactants, dispersants, plasticizers, rheological additives, waxes, silicones, anti-static agents, to name a few.

Colorants other than the metallic pigment may also be included in the metallic pigment-containing ink, and in the inks that do not include metallic pigments. Such colorants include, for example, organic or inorganic pigments and dyes. The dyes include but are not limited to fluorescent dyes, azo dyes, anthraquinone dyes, xanthene dyes, azine dyes, and combinations thereof. Organic pigments may be one pigment or a combination of pigments, such as for instance Pigment Yellow Numbers 12, 13, 14, 17, 74, 83, 114, 126, 127, 174, 188; Pigment Red Numbers 2, 22, 23, 48:1, 48:2, 52, 52:1, 53, 57:1, 112, 122, 166, 170, 184, 202, 266, 269; Pigment Orange Numbers 5, 16, 34, 36; Pigment Blue Numbers 15, 15:3, 15:4; Pigment Violet Numbers 3, 23, 27; and/or Pigment Green Number 7. Inorganic pigments may be one of the following non-limiting pigments: iron oxides, titanium dioxides, chromium oxides, ferric ammonium ferrocyanides, ferric oxide blacks, Pigment Black Number 7 and/or Pigment White Numbers 6 and 7. Other organic and inorganic pigments and dyes can also be employed, as well as combinations that achieve the colors and/or effects desired.

In one inventive aspect, a metallic pigment containing ink may have the following composition:
 3 to 35 wt % metallic pigment;
 4 to 25 wt % resin system, e.g., one or more resins;
 10 to 95 wt % solvent system, e.g., one or more solvents;
 0.1 to 20 wt % colorant system, e.g., one or more colorants; and
 0.1 wt % to 15 wt % additional additives.

The metallic pigment containing inks may be used in combination with other kinds of inks, e.g., inks that do not include a metallic pigment. The other inks may be any commercially available ink products that are compatible for use with the metallic pigment-containing inks described herein. For example, the present metallic pigment-containing inks are preferably used in flexographic and gravure printing operations; thus, the commercially available inks not including metallic pigments should be compatible for use a flexographic or gravure printing operation. The combinations of inks can be provided in kits of inks. Suitable commercially available inks not including metallic pigments include, for example: SunSpectro Solvaplast 901, SunSpectro Sunsharp, SunStrato DPT-285, Sunstrato Flexomax, SunStrato DPX-377, SunStrato Rotopure, SunStrato Excelbond, SunStrato Nulam, and SunSpectro Harmony. SunSpectro Aquaking, SunVisto Advantage, SunVisto Ultrasak, and SunStrato AquaBond.

As indicated, the metallic pigment-containing inks exhibit a magnitude of exotherm that is less than 1200 Joules/gram (J/g) according to the test method described below, e.g., a magnitude of exotherm of 0.01 J/g to 1200 J/g, or no observable magnitude of exotherm. The Applicants have found that the inventive metallic pigment-containing inks disclosed herein that meet these criteria are less susceptible to combusting and thus pose substantially less of a safety hazard, e.g., they are less likely to spark, combust, catch fire, and/or explode when running on a printing press.

In one aspect of the present disclosure, and in accordance with the test methods described below, preferably the metallic pigment-containing inks exhibit a magnitude of exotherm that is 0.01 J/g to 1100 Joules/gram (J/g); more preferably the metallic pigment-containing inks exhibit a magnitude of exotherm that is 0.01 J/g to 1000 Joules/gram (J/g); still more preferably the metallic pigment-containing inks exhibit a magnitude of exotherm that is 0.01 J/g to 800 Joules/gram (J/g); even still more preferably the metallic pigment-containing inks exhibit a magnitude of exotherm that is 0.01 J/g to 600 Joules/gram (J/g); yet even still more preferably the metallic pigment-containing inks exhibit a magnitude of exotherm that is 0.01 J/g to 200 Joules/gram (J/g); yet even further still more preferably the metallic pigment-containing inks exhibit a magnitude of exotherm that is 0.01 J/g to 100 Joules/gram (J/g); and yet more further preferably the metallic pigment-containing inks exhibit no observable magnitude of exotherm.

In one embodiment, the present invention comprises a combination of inks printed on a substrate, the combination comprising at least one metallic pigment-containing ink and at least one ink not containing a metallic pigment. The metallic pigment-containing inks exhibit a magnitude of exotherm that is 0.01 J/g to 1200 J/g, or exhibit no observable magnitude of exotherm. The preferred ranges for magnitude of exotherm, including observing no exotherm, is as provided above.

In another embodiment, the present invention comprises a series of flexographic or gravure inks comprising at least one metallic pigment-containing ink and at least one non-metallic ink wherein the at least one metallic ink optionally has a small amount of nitrocellulose resin (e.g., 9.0 wt % or less, as described above). Metallic inks with 9.0 wt % or less nitrocellulose resin are shown to be less prone to sparking and thus present a decreased fire and explosion hazard.

The metallic pigment-containing inks or the present disclosure are described in relation to inks suitable for printing according to the flexographic and gravure print processes. It should be readily understood that the presently described metallic pigment containing inks can also be printed by other print processes and used with the equipment employed in same, such as lithography, offset printing, screen printing, digital printing (e.g., ink jet printing), and printing employing energy curing (e.g., UV-curing and electron beam curing). It should be understood that the ink formulation may have to be modified when used in other printing processes, such as by adjusting the formulation accordingly, or adding additional components to same in order to adjust ink viscosity and/or provide for a performance capability (e.g., include ethylenically unsaturated monomers, etc. and photoinitiators to provide for energy curing capabilities).

In another embodiment, the metallic pigment-containing inks are essentially free of nitrocellulose resin.

The following examples are intended to exemplify ink compositions that come within the scope of the disclosure, and to show the benefits that such exemplary compositions possess. The examples should not be construed as limiting the scope of the invention.

EXAMPLES

All amounts of components are wt % amounts, unless otherwise noted.

Example 1 (Inventive)

A metallic pigment-containing ink composition that is free of nitrocellulose resin, includes polyvinyl butyral resin, and is suitable for flexographic printing was prepared as follows:

An intermediate was prepared by mixing the following ingredients:

TABLE 1

Example 1A Intermediate

| Material | wt % |
|---|---|
| ETHYL ALCOHOL | 74.3 |
| ISOPROPYL ALCOHOL | 8.4 |
| NORMAL PROPYL ACETATE | 0.8 |
| BL-1, POLYVINYL BUTYRAL (Sekisui) | 14.7 |
| AMINO SILANE Z6020 (Dow) | 0.8 |
| Ortho- and Para-TOLUENE SULFONAMIDE (Ritchem) | 1.0 |
| Total | 100.0 |

The Example 1A intermediate was mixed with the following ingredients to produce a finished ink:

TABLE 2

Example 1B Metallic Ink

| Materiel | wt % |
|---|---|
| Example 1A Intermediate | 57.7 |
| NORMAL PROPYL ALCOHOL | 18.5 |
| NORMAL PROPYL ACETATE | 4.6 |
| 6282 ® BENDA LUTZ METALLIC PIGMENT | 19.2 |
| Total | 100.0 |

6282® BENDA LUTZ is a non-leafing aluminum pigment. The intermediate and the final ink formulations were mixed with a Cowles mixer.

Example 2 (Comparative) Nitrocellulose Resin-Based Ink

An intermediate was prepared by mixing the following ingredients:

TABLE 3

Example 2A Intermediate

| Material | % |
|---|---|
| NORMAL PROPYL ALCOHOL | 24.25 |
| GEN III Nitro Varnish (Example 2B) | 45.65 |
| UNIREZ 2248 (Arizona Chemical) | 0.700 |
| UNIREZ 2221 (Arizona Chemical) | 0.70 |
| HERCOLYN D (Pinova) | 1.30 |
| DIBUTYL SEBACATE | 1.30 |
| DIACETONE ALCOHOL | 3.00 |
| PROPASOL SOLVENT P | 3.00 |
| ETHYL ALCOHOL SDA-3C | 20.10 |
| Total | 100.00 |

PROPASOL SOLVENT P is propylene glycol n-propyl ether.

A second intermediate was prepared by mixing the following ingredients:

TABLE 4

Example 2B GEN III Nitro Varnish

| Material | % |
|---|---|
| NORMAL PROPYL ALCOHOL | 30 |
| NORMAL PROPYL ACETATE | 30 |
| ¹DMX 3-5 NITROCELLULOSE (Nobel) | 40 |
| Total | 100 |

The intermediates of Examples 2A and 2B were mixed with the following ingredients to produce a finished ink suitable for flexographic printing:

TABLE 5

Example 2C Metallic Ink

| Material | % |
|---|---|
| Example 2A Intermediate | 79.3 |
| Example 2B Nitro Varnish | 9.4 |
| 6282 ® BENDA LUTZ METALLIC PIGMENT | 11.3 |
| Total | 100.0 |

Example 3 (Inventive)

A non-nitrocellulose resin, acrylic-based ink suitable for flexographic printing was prepared as follows as an intermediate:

TABLE 6

Example 3A Extender

| Material | % |
|---|---|
| NORMAL PROPYL ALCOHOL | 44.18 |
| NORMAL PROPYL ACETATE | 25.84 |
| NEOCRYL B-814 ACRYLIC (DSM Resins) - a resin | 10.72 |
| CELLULOSE ACETATE PROPIONATE CAP-504-0.2 (EASTMAN) - a resin | 8.50 |
| 30RES-ACR-2013 ACRYLIC (Lucite Corp) - a resin | 2.08 |
| ORTHOPARATOLUENE SULFANOMIDE PLASTICIZER | 3.00 |
| GAMMA-BUTYROLACTONE | 2.68 |
| PM ACETATE | 3.00 |
| Total | 100.00 |

The Example 3A intermediate was mixed with the following ingredients to produce a finished ink:

TABLE 7

Example 3B Metallic Ink

| Material | % |
|---|---|
| Example 3A EXTENDER | 88.7 |
| 6282 ® BENDA LUTZ METALLIC PIGMENT | 11.3 |
| Total | 100.0 |

Example 4 (inventive) A Non-Nitrocellulose Resin, Urethane-Based Metallic Ink An intermediate was prepared by mixing the following ingredients:

TABLE 8

Example 4A Urethane Extender

| Material | % |
|---|---|
| POLYETHER POLYURETHANE | 64 |
| NORMAL PROPYL ALCOHOL | 21 |
| PROPASOL SOLVENT P | 5 |
| ETHOXYPROPANOL | 5 |
| TV97-7111:25% POLYVINYL BUTYRAL SOLUTION (Kuraray America) | 5 |
| Total | 100 |

TV97-7111:25% polyvinyl butyral solution is a 25 wt % solids resin solution of polyvinyl butyral (PVB) resin.

The Example 4 intermediate was mixed with the following ingredients to produce a finished ink suitable for flexographic printing:

TABLE 9

Example 4B Metallic Ink

| Material | % |
|---|---|
| EXAMPLE 4 INTERMEDIATE | 88.7 |
| 6282 ® BENDA LUTZ METALLIC PIGMENT | 11.3 |
| Total | 100.0 |

Examples 5-10 and Comparative Examples 2C and 3-5

Flexographic Metallic Ink Examples with Varying % of Nitrocellulose Resin

Additional examples were prepared as described above, using the components listed in Table 10. The amount of nitrocellulose resin was varied from example to example. Comparative Example 2C is of the same composition as described above. The compositions are reported in Table 10 below.

The above metallic finished inks were flexographically printed onto oriented polypropylene (OPP) using a 7.0 BCM (billion cubic microns) anilox.

Example 11—Impact Sparking Test

The following test was performed to see if the compositions will spark. A clean, two-inch stainless steel ball bearing was dip coated in one of the ink compositions of Table 10 to form a metallic ink film on the ball bearing. The film was dried at room temperature for 16 hours prior to the impact spark test. After drying, the coated ball bearing was impacted with a second, uncoated, but otherwise identical, stainless steel ball bearing by clapping the two ball bearings together by hand in a dark room while observing the contact to see if visible sparks are generated. The results of the sparking test are reported in Table 11.

Example 12—Differential Scanning Calorimetry Test

Procedure Used for Determining Exotherms in Metallic Inks

Ink compositions of Table 10 are placed in an 8 oz. glass jar. The jar is hand shaken. The compositions are stirred slightly using a Fischer disposable transfer pipet (Cat. 13-711-7M). Approximately 3 ml of the ink compositions are transferred, using the transfer pipet, to a Fischer low form fluted aluminum weighing dish (Cat. 08-732-101), and distributed evenly therein. The solvents in the ink compo-

TABLE 10

|  | 2C (Comp.) | Comp. Ex. 3 | Comp. Ex. 4 | Comp. Ex. 5 | Example 5 (Inv.) | Example 6 (Inv.) | Example 7 (Inv.) | Example 8 (Inv.) | Example 9 (Inv.) | Example 10 (Inv.) |
|---|---|---|---|---|---|---|---|---|---|---|
| 320-7: Normal Propyl Alcohol | 19.20 | 21.50 | 21.50 | 21.50 | 24.20 | 25.05 | 29.55 | 30.10 | 35.90 | 39.75 |
| Example 2B Varnish (28% nitrocellulose solids) | 45.60 | 38.70 | 35.50 | 32.85 | 28.40 | 25.25 | 18.85 | 15.10 | 8.00 | 1.35 |
| 938-181: Unirez 2248 (polyamide) | 0.55 | 1.15 | 1.85 | 2.75 | 3.65 | 4.80 | 5.75 | 7.35 | 8.00 | 9.40 |
| 938-193: Unirez 2221 (polyamide) | 0.55 | 1.15 | 1.85 | 2.75 | 3.65 | 4.80 | 5.75 | 7.35 | 8.00 | 9.40 |
| 390-79: Hercolyn D (plasticizer) | 1.05 | 1.15 | 1.15 | 1.15 | 1.15 | 1.15 | 1.15 | 1.15 | 1.15 | 1.15 |
| 390-55: Dibutyl Sebacate (plasticizer) | 1.05 | 1.15 | 1.15 | 1.15 | 1.15 | 1.15 | 1.15 | 1.15 | 1.15 | 1.15 |
| 320-57: Diacetone Alcohol | 2.40 | 2.65 | 2.65 | 2.65 | 2.65 | 2.65 | 2.65 | 2.65 | 2.65 | 2.65 |
| 320-217: Propylene glycol n-propyl ether | 2.40 | 2.65 | 2.65 | 2.65 | 2.65 | 2.65 | 2.65 | 2.65 | 2.65 | 2.65 |
| 320-263: Ethyl Alcohol | 15.90 | 18.60 | 20.40 | 21.25 | 21.20 | 21.20 | 21.20 | 21.20 | 21.20 | 21.20 |
| 6282 ® BENDA LUTZ metallic pigment | 11.30 | 11.30 | 11.30 | 11.30 | 11.30 | 11.30 | 11.30 | 11.30 | 11.30 | 11.30 |
| Total | 100.00 | 100.00 | 100.00 | 100.00 | 100.00 | 100.00 | 100.00 | 100.00 | 100.00 | 100.00 |
| Total % nitrocellulose in formulation | 12.8 | 10.8 | 9.9 | 9.2 | 8 | 7.1 | 5.3 | 4.2 | 2.2 | 0.4 |

Comp. = comparative;
Inv. = inventive sitions are allowed to evaporate overnight at ambient temperature in a fume hood. The solid ink compositions are scraped into 20 ml plastic vials with a micro spatula, and the compositions are chopped up using the spatula. A small amount of the solid ink composition, about 0.8 mg, but between 0.5 mg to 1.0 mg, is transferred to a tared TA Instruments Tzero Pan (part #901683.901), using curved tweezers (part #271580.001). The composition pieces are laid flat in the pan and the weight is recorded. A Tzero Hermetic Lid (part #901684.901) is placed on the pan. The lid is crimped onto the pan using TA Instruments Tzero press (part #901600.901) fitted with the Tzero Hermetic die set. An empty reference pan is also prepared in the same way. The composition pan and reference pan are placed into the DSC Q20 instrument. The instrument is cooled to a set point of 25° C. and then the pans are loaded into the cell via the auto sampler. They are then cooled at 10° C./min. to 0° C., held for 3 min. at 0° C. and then heated at 10° C./min. to 250° C. The process is repeated for all compositions of Table 10.

The results are analyzed using TA Instruments Universal Analysis 2000 software for Windows 2000/XP, version 4.4A. The function "Integrate Peak Linear" is chosen. Two crosses appear on the graph and are manually moved along the curve to choose the start and end points of the exotherm. The onset temperature is chosen where the line starts to curve up from the baseline, and the endpoint is chosen where the line flattens out at the end of the exotherm The magnitude of the exotherm (enthalpy as J/g) and the onset temperature are calculated by the software and displayed on the thermogram (DSC curve). The reported onset temperature is the manually chosen onset point and the enthalpy (in J/g) is calculated by the software by integrating the peak in the thermogram.

Multiple tests on a series of samples reveals a ±factor of about 4% (J/g) for the exotherm enthalpy test. Note: 1 Joule=0.239 Calories; or 1 calorie=4.184 Joules.

Table 11

Results of Differential Scanning Calorimetry (DSC) and Sparking Test

| Sample ID | Magnitude of exotherm (J/g) | Sparks observed on impact (yes/no) |
|---|---|---|
| Example 1B (Inv.) | Not observed | No |
| Example 3B (Inv.) | Not observed | No |
| Example 4B (Inv.) | Not observed | No |
| Example 2C (Comp.) | 1639 | Yes |
| Comp. Example 3 | 1431 | Yes |
| Comp. Example 4 | 1365 | Yes |
| Comp. Example 5 | 1205 | Yes |
| Inv. Example 5 | 1104 | No |
| Inv. Example 6 | 1018 | No |
| Inv. Example 7 | 770 | No |
| Inv. Example 8 | 549 | No |
| Inv. Example 9 | 181 | No |
| Inv. Example 10 | 10 | No |

Example 13

A metallic pigment-containing ink composition comprising 12.8 wt % metallic pigment (aluminum), 78.7 wt % solvent (41.3 ethanol, 13.5 isopropyl alcohol, 18.9 propanol, 5.0 of normal propyl acetate), and 8.5 wt % polyvinyl butyral resin was formulated. This ink is nitrocellulose resin-free (0 wt % NC) and its exotherm is less than 1200 J/g, and thus this is a metallic pigment-containing ink in accordance with the present disclosure. In press runs taking place over a period of about one (1) year, polypropylene substrates were printed with this metallic pigment-containing ink and with non-metallic inks of other colors to print a graphic design. During the ~1 year period, no incidences of sparking, ignition, combustion, fire, or explosion occurred. The press was a flexographic press. The press was run at speeds of about 1600 feet per minute (ft/min).

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed is:

1. A metallic pigment-containing ink comprising a metallic pigment, wherein the ink exhibits a magnitude of exotherm less than 1200 J/g, or does not exhibit an observable exotherm, and wherein the ink comprises, based on the total weight of the ink, 0.01 wt % to 9.0 wt % nitrocellulose resin.

2. The metallic pigment-containing ink of claim 1, wherein the metallic pigment is selected from aluminum, bronze, copper, brass, silver, gold, and combinations thereof.

3. The metallic pigment-containing ink of claim 1, wherein the metallic pigment is an aluminum pigment.

4. The metallic pigment-containing ink of claim 1, wherein the metallic pigment is a non-leafing aluminum pigment.

5. The metallic pigment-containing ink of claim 1, further comprising one or more resins selected from the group consisting of acrylates, methacrylates, polyurethanes, polyvinyl butyrals, polyesters, cellulose acetate propionates, polyamides, vinyls, and combinations thereof.

6. The metallic pigment-containing ink of claim 1, further comprising one or more solvents selected from aliphatic hydrocarbons, cyclic hydrocarbons, aromatic hydrocarbons, ketones, aldehydes, alcohols, ethers, esters, and combinations thereof.

7. The metallic pigment-containing ink of claim 1, further comprising a colorant.

8. The metallic pigment-containing ink of claim 1, further comprising an additive selected from the group consisting of adhesion promoters, de-gassing additives, flow promoters, defoamers, antioxidants, surfactants, dispersants, plasticizers, rheological additives, anti-static agents, waxes, silicones, and combinations thereof.

9. The metallic pigment-containing ink of claim 1, wherein the ratio of metallic pigment to nitrocellulose resin is 1:0.50 to 1:32.50, on a weight to weight basis.

10. The metallic pigment-containing ink of claim 1, further comprising an alcohol solvent, an acetate solvent, and a polyvinyl butyral resin.

11. The metallic pigment-containing ink of claim 1, further comprising an alcohol solvent, an acetate solvent, and an acrylic resin.

12. The metallic pigment-containing ink of claim 1, further comprising cellulose acetate propionate resin.

13. The metallic pigment-containing ink of claim 1, further comprising an alcohol solvent, an acetate solvent, an ether alcohol solvent, a polyurethane resin, and a polyvinyl butyral resin.

14. The metallic pigment-containing ink of claim 13, wherein the polyurethane resin is a polyether polyurethane resin.

15. The metallic pigment containing ink of claim 1, further comprising an alcohol solvent, an ether alcohol solvent, and a polyamide resin.

16. A kit of inks for printing articles with a metallic pigment-containing ink comprising:
   one or more of the metallic pigment-containing inks of claim 1; and
   one or more inks that do not include a metallic pigment.

17. A printed article comprising:
   a substrate; and
   the metallic pigment-containing ink of claim 1, printed on the substrate.

18. The printed article of claim 17, wherein the substrate is a material selected from polypropylene, polyvinyl chloride, oriented polystyrene, polyethylene terephthalate, glycol-modified polyethylene terephthalate, and polylactic acid.

19. A printed article comprising:
   a substrate;
   at least one metallic pigment-containing ink provided in the kit of claim 16 printed on the substrate; and
   at least one ink that does not include a metallic pigment provided in the kit of claim 16 printed on the substrate.

20. The printed article of claim 19, wherein the substrate is a material selected from polypropylene, polyvinyl chloride, oriented polystyrene, polyethylene terephthalate, glycol-modified polyethylene terephthalate, and polylactic acid.

21. A method of printing an article, comprising:
   providing a substrate;
   printing a metallic pigment-containing ink according to claim 1, on the substrate.

22. The method of claim 21, wherein the substrate is a material selected from polypropylene, polyvinyl chloride, oriented polystyrene, polyethylene terephthalate, glycol-modified polyethylene terephthalate, and polylactic acid.

23. The method of claim 21, wherein the printing is selected from flexographic printing and gravure printing.

24. A method of printing an article, comprising:
   providing a substrate; and
   printing, in a selected series,
      at least one metallic pigment-containing ink provided in the kit of claim 16 on the substrate; and
      at least one ink that does not include a metallic pigment provided in the kit of claim 16 printed on the substrate.

25. The method of claim 24, wherein the substrate is a material selected from polypropylene, polyvinyl chloride, oriented polystyrene, polyethylene terephthalate, glycol-modified polyethylene terephthalate, and polylactic acid.

26. The method of claim 24, wherein the printing is selected from flexographic printing and gravure printing.

27. The method of claim 24, wherein at least one metallic pigment-containing ink and the at least one ink that does not include a metallic pigment comprise resins that are different from each other.

* * * * *